United States Patent

Sugi

[11] Patent Number: 5,774,810
[45] Date of Patent: Jun. 30, 1998

[54] MOBILE RADIO COMMUNICATION DEVICE

[75] Inventor: Nobuo Sugi, Tachikawa, Japan

[73] Assignee: Kabushiki Kaisha Toshiba, Kawasaki, Japan

[21] Appl. No.: 673,823

[22] Filed: Jun. 27, 1996

[30] Foreign Application Priority Data

Jun. 27, 1995 [JP] Japan ................................. 7-160858

[51] Int. Cl.[6] ..................................................... H04B 7/26
[52] U.S. Cl. ........................ 455/502; 455/434; 455/515; 370/503
[58] Field of Search ...................... 455/502, 515, 455/516, 517, 226.1, 226.2, 434; 370/252, 332, 503

[56] References Cited

U.S. PATENT DOCUMENTS 5,257,408  10/1993  Olson et al. ............................ 455/516
5,440,561  8/1995  Werronen ................................ 455/502

*Primary Examiner*—Chi H. Pham
*Attorney, Agent, or Firm*—Banner&Witcoff, Ltd.

[57] ABSTRACT

This is a mobile radio communication device having a base station and a mobile station that is connected by radio with this base station using time division multiple access, in which stable connection with the base station can be achieved and subsequently stable radio communication can be conducted. In the initial period of communication with the base station, the mobile station receives the signal from the base station asynchronously; under the condition that the field intensity of a signal transmitted by the base station exceeds a first threshold value, synchronization establishment control is performed in which a synchronization establishment operation is performed with the base station; after establishment of synchronization with the base station by the synchronization establishment operation, synchronization maintenance operation with this base station is performed under the condition that the field intensity from this base station exceeds a second threshold value that is smaller than the first threshold value.

20 Claims, 9 Drawing Sheets

MOBILE RADIO COMMUNICATION DEVICE

BACKGROUND OF THE INVENTION

1. Field of the Invention

The present invention relates to a mobile radio communication device, and in particular relates to a mobile radio communication device wherein a digital communication system of the time division multiple access (TDMA) type is adopted.

2. Description of the Related Art

In a radio communication system of the TDMA (time division multiple access) type, the signals of a plurality of mobile stations are transmitted with time division on the same frequency. For example, in a four-channel multiplex RDMA system, a single frame is divided into four time slots and the signal of a single mobile station is allocated to one time slot, so that signals of a maximum of four mobile stations can be transmitted with the same frequency.

At the receiving end, it is arranged for only the signals of the transmitted party to be received by effecting synchronization with the time slot of the transmission end, so that frame-synchronized received signals can be received. In more detail, in a digital communication system of this type, the base station or network accommodating the base station determines the TDMA timing such as that of the frames and/or time slots, and the mobile station is operated in synchronism with this timing.

However, in the case of a mobile station just after it has been switched on or just after it is moved into the radio service area from outside it, the reception clock will not be synchronized with the transmission clock of the base station and the TDMA timing will not be known. The mobile station therefore first of all continuously receives the frequency in question (asynchronous reception), waiting for a signal from the base station.

The signal from the base station contains preamble bits repeated in a fixed pattern; the mobile station regenerates the transmission clock of the base station by receiving these and performs an operation to pull in the reception clock by synchronizing its own reception clock with this.

In addition, the signal from the base station contains synchronization bits; the mobile station receives these bits with the reception clock synchronized to the base station. The mobile station then performs synchronization establishment operation in which it seizes the TDMA timing of the base station then performs synchronization establishment operation in which it seizes the TDMA timing of the base station from the position of the synchronization bits received and the frame structure, which are laid down beforehand; subsequently, it shifts to synchronous reception of only this time slot transmitted by the base station.

Also, on synchronization reception, it performs a synchronization maintenance operation to maintain the TDMA timing produced by demodulation of the reception clock and synchronization bit reception.

However, in the above asynchronous reception if the mobile station spuriously recognises noise as a signal from the base station, the base station may shift to synchronized reception with the wrong TDMA timing. As a result, it will only detect failure of synchronization on failure of reception a fixed number of times as the synchronization signal which it ought not to be receiving is repeated; it will then return to asynchronous reception.

Consequently, some considerable time may elapse before synchronization with the base station is established and communication becomes possible. In particular, since noise has a random pattern, the probability of such spurious operation occurring is quite high.

In order to prevent this, in conventional radio communication systems, there was provided means that monitored the level of the RSSI (received signal strength indicator) signal that was output from the radio receiver of the mobile station during asynchronous reception, and that performed pull-in operation of the reception clock and establishment of synchronization only when the level of this signal exceeded a threshold value as a result of which it was judged that sufficient sensitivity of reception existed.

Also, there was provided means that, also during synchronous reception, constantly monitored the level of the RSSI signal at the mobile station so as to exclude the possibility of the mobile station operation spuriously in response to reception of noise rather than the signal from the base station, and which maintained synchronization only whilst this threshold value was exceeded.

That is, in the conventional radio communication system, an RSSI signal that was output from the radio receiver of the mobile station was input to an analog signal comparator and the result of comparison with a threshold value that decided whether sufficient reception sensitivity existed was output, ON/OFF on establishment of synchronization and maintenance of synchronization being controlled by this output signal.

However, when a mobile station is searching for a base station under asynchronous reception, if it finds and connects up to a base station of low reception level, subsequent synchronization maintenance in synchronized reception is difficult and there is a possibility of communication becoming impossible whilst service is in progress. In order to prevent this, it is necessary to set the threshold value of the RSSI signal level that determines reception clock pull-in during asynchronous reception and ON/OFF of synchronization establishment on the high side.

On the other hand, in order to extend the distance over which communication is possible after shifting to synchronous reception, it is necessary to maintain synchronization even through the signal level from the base station has become somewhat weaker: it is therefore necessary to keep the threshold level of the RSSI signal that determines ON/OFF of synchronization maintenance during synchronous reception as low as possible.

Thus, the requirements in respect of the RSSI signal level threshold value are exactly opposite for asynchronous reception and synchronous reception; as shown in FIG. 5, with the conventional radio communication system that employed only a single analog signal comparator one or other of these demands had to be sacrificed.

This is, conventionally, the threshold value was normally set to a low level, giving priority to maintenance of service; however, in this case, there was a high probability of connecting to radio base stations where reception conditions were not really very good.

SUMMARY OF THE INVENTION

An object of the present invention is therefore to provide a mobile radio communication device wherein connection to radio base stations can be achieved in stable manner and wherein radio communication can subsequently be performed in stable manner.

In order to achieve this object, the present invention comprises: a base station and a mobile station connected by radio with the base station, and employing the time division multiple access system; wherein the mobile station comprises: field intensity detection means that detects the field intensity of a signal transmitted by the base station; and synchronization establishment and maintenance control means whereby: at the commencement of communication with the base station asynchronous reception is performed of signals from the base station, and synchronization establishment control is conducted whereby a synchronization establishment operation with the base station is performed under the condition that the field intensity detected by the field intensity detection means exceeds a first threshold value; and, after establishment of synchronization with the base station by the synchronization establishment operation, a synchronization maintenance operation is conducted with the base station under the condition that the field intensity detected by the field intensity detection means exceeds a second threshold value smaller than the first threshold value.

The synchronization establishment and maintenance control means may comprise: reception sensitivity decision means that, by comparing the received field intensity detected by the field intensity detection means with the first threshold value and the second threshold value, outputs a first decision signal if the received field intensity exceeds the first threshold value, and outputs a second decision signal if the received field intensity exceeds the second threshold value; and control means that performs the synchronization establishment operation based on the first decision signal which is output from the reception sensitivity decision means and that performs the synchronization maintenance operation based on the second decision signal that is output from the reception sensitivity decision means.

The reception sensitivity decision means may comprise: first threshold value setting means that sets that first threshold value, first comparison means that outputs the first decision signal by comparing the received field intensity detected by the field intensity detection means and the first threshold value set by the first threshold value setting means; a second threshold value setting means that sets the second threshold value; second comparison means that outputs the second decision signal by comparing the received field intensity detected by the field intensity detection means and the second threshold value set by the second threshold value setting means; and a selection means that selectively outputs the first decision signal that is output from the first comparison means or the second decision signal that is output from the second comparison means, under the control of an instruction from the control means.

The first threshold value setting means may be constructed to set the first threshold value in a way that can be altered and the second threshold value setting means may be constructed to set the second threshold value in a that can be altered.

The control means, if the synchronization establishment operation is being performed, may be constructed to instruct the selection means to select the first decision signal, and, if the synchronization maintenance operation is being performed, may be constructed to instruct the selection means to select the second decision signal.

The reception sensitivity decision means may comprise: threshold value data storage means that stores threshold value data from the control means; and comparison means that outputs a decision signal by comparing the received field intensity detected by the field intensity detection means with the threshold value corresponding to threshold value data stored in the threshold value data storage means.

The control means, in the case where the synchronization establishment operation is being performed, may be constructed to output first threshold value data corresponding to the first threshold value to the reception sensitivity decision means, and, if the synchronization maintenance operation is being performed, may be constructed to output second threshold value data corresponding to the second threshold value to the reception sensitivity decision means.

The control means, if the synchronization establishment operation is being performed, may be constructed to output first threshold value data corresponding to the first threshold value to the reception sensitivity decision means which is successively diminished, and, when a first decision output corresponding to the first threshold value is output from the comparison means, may be constructed to control the synchronization establishment operation with the base station that has output the first decision output.

The control means, when the synchronization establishment operation is being performed, may be constructed to output first threshold value data corresponding to the first threshold value to the reception sensitivity decision means, and, when a first decision output corresponding to the first threshold level is output from the comparison means, may be constructed to store the base stations in respect of which the first decision output was output and the received field intensities of these base stations and to control the synchronization establishment operation with the base station whose received field intensity is a maximum of the stored received field intensities.

With such a construction, when synchronization establishment operation is conducted, the mobile station effects connection after waiting for a sufficiently high reception level to be achieved to give a stable condition instead of making unjustifiable connections when the level of the signal received from the base station is low; thus performance is improved in that stable communication can subsequently be conducted. Also, during maintenance of synchronization, the service distance from the base station can be extended to the maximum possible.

DESCRIPTION OF THE PREFERRED EMBODIMENTS

An embodiment of a mobile radio communication device according to the present invention is described below in detail with reference to the drawings.

Figure 1:
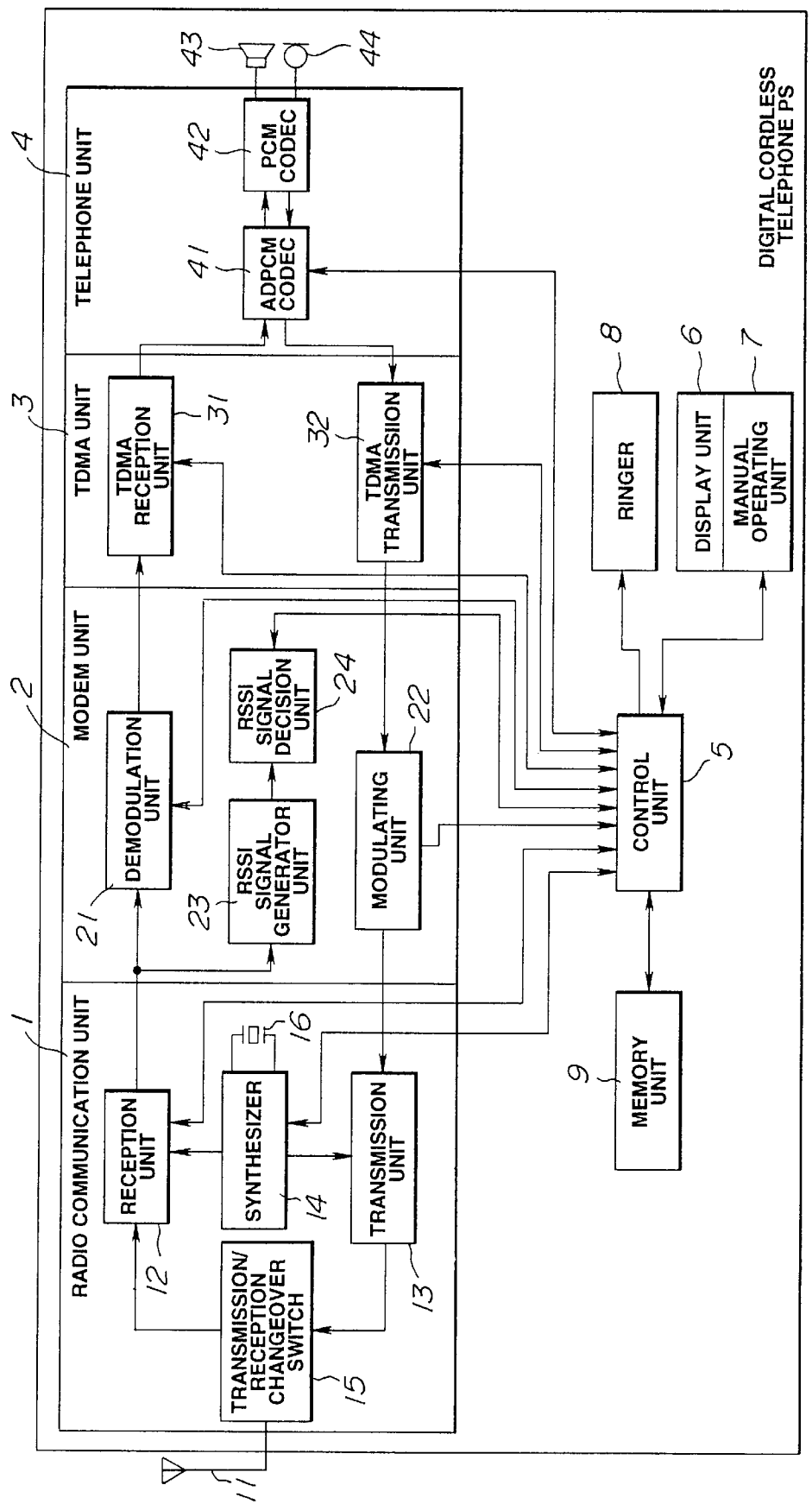
FIG. 1 is a block diagram showing an embodiment of the construction of a mobile station in a mobile radio communication device according to the present invention.

FIG. 1 shows a block diagram showing in outline the construction of a mobile station in a radio communication device according to the present invention. The mobile station shown in FIG. 1 constitutes a mobile station in a so-called second generation cordless telephone system. It comprises a radio unit 1, a modem unit 2, a TDMA unit 3, a telephone unit 4, a control unit 5, a display unit 6, a manual operating unit 7, a ringer 8, and a memory unit 9.

Radio unit 1 performs processing of radio signals such as the received signal from antenna 11 and the transmission signal to antenna 11. It comprises a reception unit 12 that performs processing of the reception signal, a transmission unit 13 that performs processing of the transmission signal, a synthesizer 14 that controls the frequency of the reception signal in reception unit 12 and the frequency of the transmission signal in transmission unit 13, a transmission/reception changeover switch 15 that changes over between the reception signal from antenna 11 and transmission signal to antenna 11, and an oscillator element 16 that outputs an oscillation signal to synthesizer 14.

Modem unit 2 performs demodulation and modulation of the signals that are transmitted and received. It comprises a demodulation unit 21 that demodulates the reception signal received by radio unit 1, and a modulating unit 22 that performs modulation of the transmission signal that is transmitted to radio unit 1. In addition, it comprises an RSSI signal generating unit 23 according to the present invention and an RSSI signal decision unit 24.

Also, TDMA unit 3 performs TDMA (time division multiple access) control, and comprises a TDMA reception unit 31 and TDMA transmission unit 32.

Also, telephone unit 4 performs encoding and decoding processing of the audio signal that is output by telephone receiver 43 and the audio signal that is input from microphone 44. It comprises an ADPCM codec 41 and PCM codec 42.

Control unit 5 exercises overall control of the entire operation of this mobile station. Display unit 6 displays various items of information. Manual operating unit 7 effects input of various items of information and commands etc, being equipped with a keyboard or the like. Ringer 8 gives notification of an incoming call. Memory unit 9 stores the various items of information necessary for control of this mobile station.

In this construction, the received signal received by antenna 11 is applied to reception unit 12 of radio unit 1 through transmission/reception changeover switch 15 and is there converted to a base band signal, which is applied to demodulation unit 21 of modem unit 2.

Concurrently, the electric field intensity of the received signal is generated by RSSI signal generating unit 23 of modem 2, based on the base band signal converted by reception unit 12 of radio unit 1.

Demodulation unit 21 of modem unit 2 demodulates the base band signal converted by reception unit 12 of radio unit 1 and applies this to TDMA reception unit 31 of TDMA unit 3; time division multiple access control is performed under the control of control unit 5, and the signal is then decoded by ADPCM codec 41 and PCM codec 42 of telephone unit 4 and converted to an audio signal, which is output as audio from telephone receiver 43.

Also, the audio signal input from microphone 44 is encoded by PCM codec 42 and ADPCM codec 41 and time division multiple access control is performed by control unit 5 in TDMA transmission unit 32 of TDMA unit 3, after which the signal is modulated in the modulating unit 24 of modem unit 2 and transmission from antenna 11 through transmission unit 13 and transmission/reception changeover switch 15 of radio unit 1.

Also, in this embodiment, the electric field intensity of the received signal is generated by RSSI signal generating unit 23 of modem unit 2, based on the base band signal converted by reception unit 12 of radio unit 1. This RSSI signal is applied to RSSI decision unit 24 which makes a decision as to whether or not there is sufficient sensitivity for reception, by comparing this RSSI signal with a prescribed threshold value; the result of this decision is communicated to control unit 5.

Control unit 5 controls TDMA reception unit 31 and TDMA transmission unit 32 of TDMA unit 3 based on the results of this decision.

In the case of asynchronous reception, this mobile station then performs ON/OFF control of pull-in of the reception clock and synchronization establishment operation, or, in the case of synchronous reception, performs ON/OFF control of the synchronism maintenance action.

Figure 2:
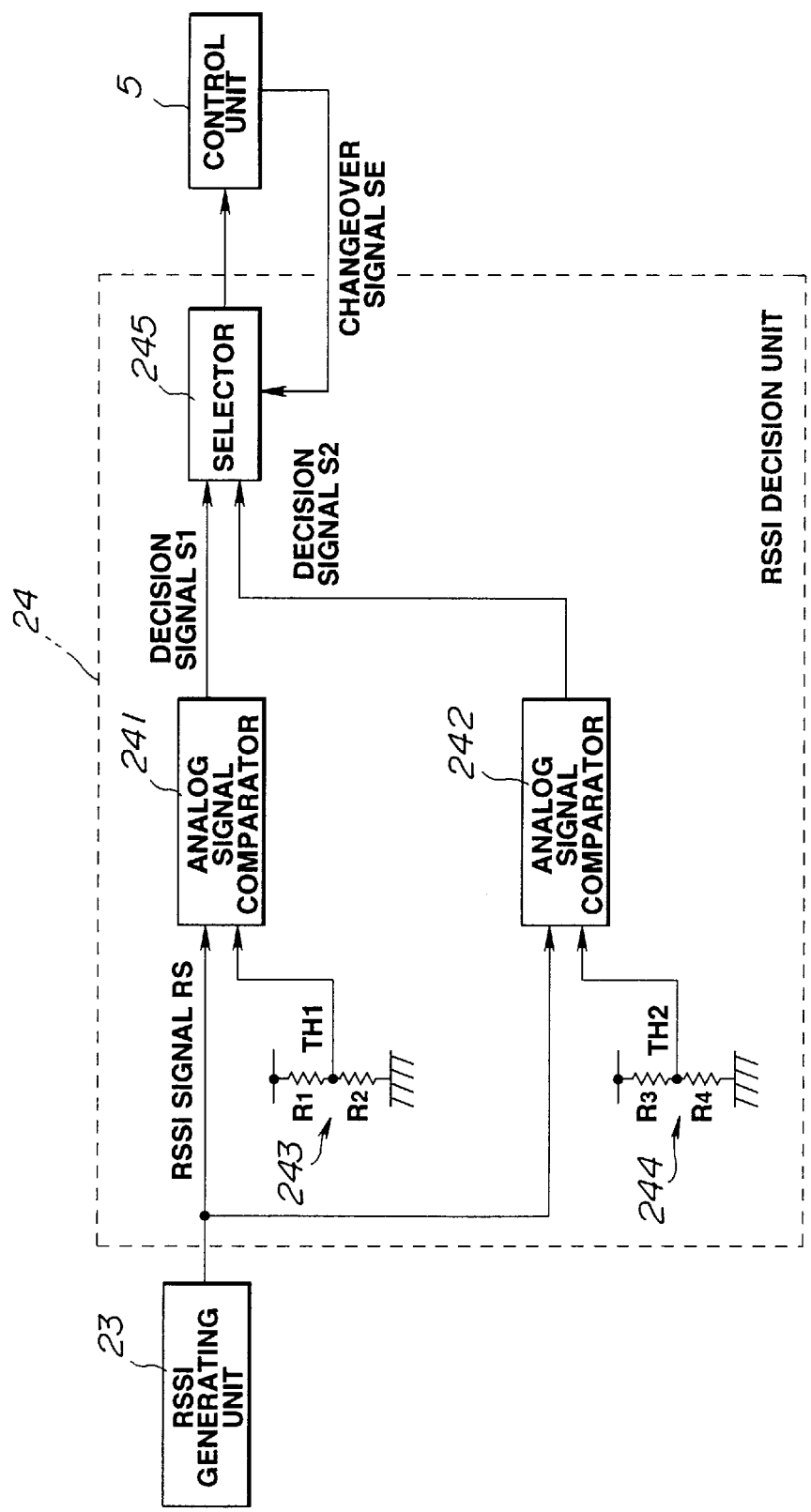
FIG. 2 is a block diagram showing an example of an RSSI decision unit in the mobile station shown in FIG. 1.

FIG. 2 shows a specific example of the layout of RSSI decision unit 24 shown in FIG. 1.

In FIG. 2, RSSI decision unit 24 of this embodiment is equipped with an analog signal comparator 241 for asynchronous reception and with an analog signal comparator 242 for synchronous reception; the RSSI signal RS generated by the RSSI generating unit 23 shown in FIG. 1 is input to both of analog signal comparator 241 for asynchronous reception and analog signal comparator 242 for synchronous reception.

Also, threshold value setting circuit 243 for asynchronous reception, consisting of resistors R1 and R2, generates a threshold value level TH1 for asynchronous use, by voltage division of the power source voltage by resistors R1 and R2, and supplies this asynchronous threshold value level TH1 to analog signal comparator 241 for asynchronous reception.

Also, threshold value setting circuit 244 for synchronous use, consisting of resistors R3 and R4, generates a threshold value level TH2 for synchronous use by voltage division of the power source voltage by resistors R3 and R4, and applies this threshold value level TH2 for synchronous use to analog signal comparator 242 for synchronous use.

The relationship TH1>TH2 exists between the threshold level TH1 for asynchronous use and the threshold value level TH2 for synchronous use, the threshold value level TH1 for asynchronous use being set as far as possible on the high side while the threshold value level TH2 for synchronous use is set as far as possible on the low side.

Analog signal comparator 241 for asynchronous use compares the RSSI signal RS generated by RSSO generating imot 23 with the threshold value level TH1 for asynchronous use set by threshold value setting circuit 243 for asynchronous use and, if RS>TH1 is established, outputs a decision signal S1 indicating that there is sufficient sensitivity for reception. Analog signal comparator 242 for synchronous reception compares the RSSI signal RS generated by RSSI generating unit 200 with the threshold value level TH2 for synchronous use set by threshold value setting circuit 244 for synchronous reception and, if RS>TH2, outputs a decision signal S2 to the effect that there is sufficient sensitivity for reception.

Decision signal S1 for asynchronous reception that is output from analog signal comparator 241 and decision signal S1 for synchronous reception that is output from analog signal comparator 242 are input to selector 245 and this decision signal S1 or decision signal S2 is selected in accordance with changeover signal SE from control unit 5 and output to control unit 5.

Control unit 5 controls ON/OFF of synchronization establishment action or synchronization maintenance action in accordance with whether or not there is sufficient sensitivity for reception, respectively selecting, by means of changeover signal SE, decision signal S1 for asynchronous reception and decision signal S2 for synchronous reception.

Figure 3:
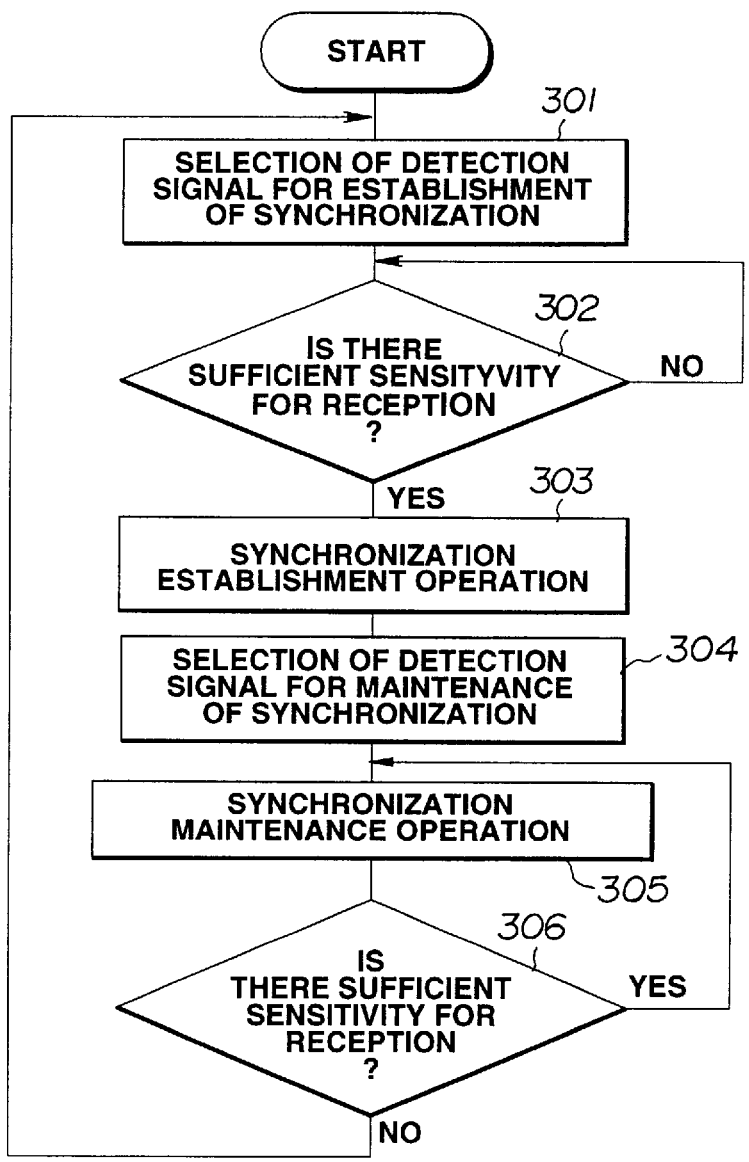
FIG. 3 is a flow chart showing the operation of a control unit in the embodiment shown in FIG. 1.

FIG. 3 is a flow chart of the operation of control unit 5 in the embodiment shown in FIG. 1.

In FIG. 3, control unit 5 shown in FIG. 1 first of all outputs to RSSI decision unit 24 a changeover signal SE that selects decision signal S1 that is output from analog signal comparator 241 for asynchronous reception, and this changes over selectors 245 of RSSI decision unit 24 so as to select decision signal S1 that is output from analog signal comparator 241 for asynchronous reception; thus decision signal S1 during asynchronous reception decision signal S1 for use in establishing synchronization is selected (setup 301). It then checks, by means of this decision signal S1 for establishment of synchronization, whether of not there is sufficient sensitivity for reception (step 302); if there is sufficient sensitivity for reception (YES in step 302), control unit 5 turns ON pull-in of the reception clock and synchronization establishment operation, and controls TDMA reception unit 31 and TDMA transmission unit 32 of TDMA unit 3 to perform synchronization establishment operation (step 303).

Also, if in the step 302 it is decided that there is insufficient sensitivity for reception (NO in step 302), processing returns to step 302; thus it waits at step 302 until there is a decision that there is sufficient sensitivity for reception.

When synchronization with the base station is established by the synchronization establishment operation of step 303, control unit 5 outputs to RSSI decision unit 24 a changeover signal SE that selects decision signal S2 that is output from analog signal comparator 242 for synchronous reception and changes over selector 245 of RSSI decision unit 24 such as to select decision signal S2 that is output from analog signal comparator 241 for synchronous reception, thereby selecting decision signal S2 during asynchronous reception i.e. decision signal S2 for synchronization maintenance (step 304).

Synchronization maintenance operation in which synchronization is maintained with the base station is then performed (step 305). Also, control unit 5 monitors decision signal S2 for synchronization maintenance from RSSI decision unit 24 (step 306); if, on the basis of this decision signal S2 for synchronization maintenance, it decides that there is sufficient sensitivity for reception (YES in step 306), it returns to step 305, and continues synchronization maintenance operation.

However, if, in step 306, on the basis of the decision signal S2 for synchronization maintenance, a decision is reached that there is insufficient sensitivity for reception (NO in step 306), it is decided that, for some reason such as this mobile station having moved out of the area of the base station with which it had been maintaining synchronization, synchronization can no longer be maintained, processing returns to step 301, causing a shift to asynchronous reception and synchronization establishment operation with another base station etc.

Figure 4:
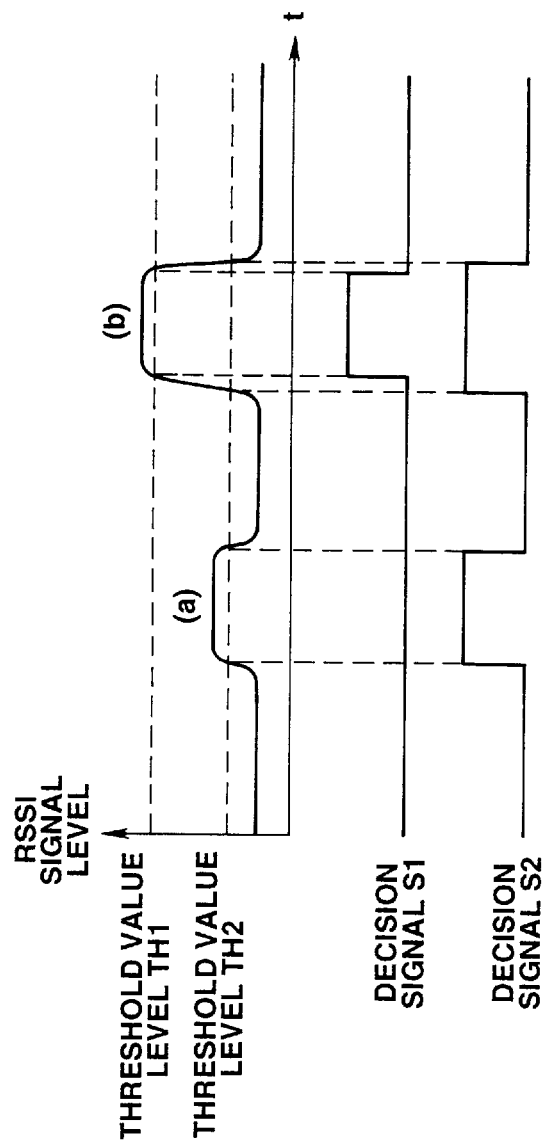
FIG. 4 is a view showing the action of making a decision as to whether there is sufficient reception sensitivity in asynchronous reception in the mobile station shown in FIG. 1.

FIG. 4 shows an example of the operation in this embodiment on asynchronous reception. During this non-operating reception, the power source of receiving unit 12 of radio unit 1 of this mobile station is always ON, so the RSSI signal level generated by RSSI signal generating unit 23 also always rises to the noise level.

If the location of the mobile station is far from the base station or if electromagnetic wave reception conditions from the base station are poor, the RSSI signal level when the signal is received from the base station does not rise very much, as shown in FIG. 4(a).

In this case, if the threshold value level were on the low side, for example threshold value level TH2 for synchronization, RSSI decision unit 24 would still decide that there is sufficient sensitivity for reception.

However, in this embodiment, in such a case, a threshold value level which is on the high side, namely, threshold value level TH1 for asynchronous use, is employed, so in the case shown in FIG. 4(a), a decision is made that there is insufficient sensitivity for reception and synchronization establishment operation with the base station is not conducted: thus connection with this base station is not performed.

When subsequently the mobile station gets closer to the base station or electromagnetic wave reception conditions from the base station improve, the RSSI signal level on reception of a signal from the base station rises, as shown in FIG. 4(b).

When this happens, the threshold value level TH1 for asynchronous use is exceeded, so RSSI decision unit 24 of this mobile station decides that there is sufficient reception sensitivity, and conducts synchronization establishment operation with this base station, thereby connecting to this base station and establishing synchronization.

Figure 5:
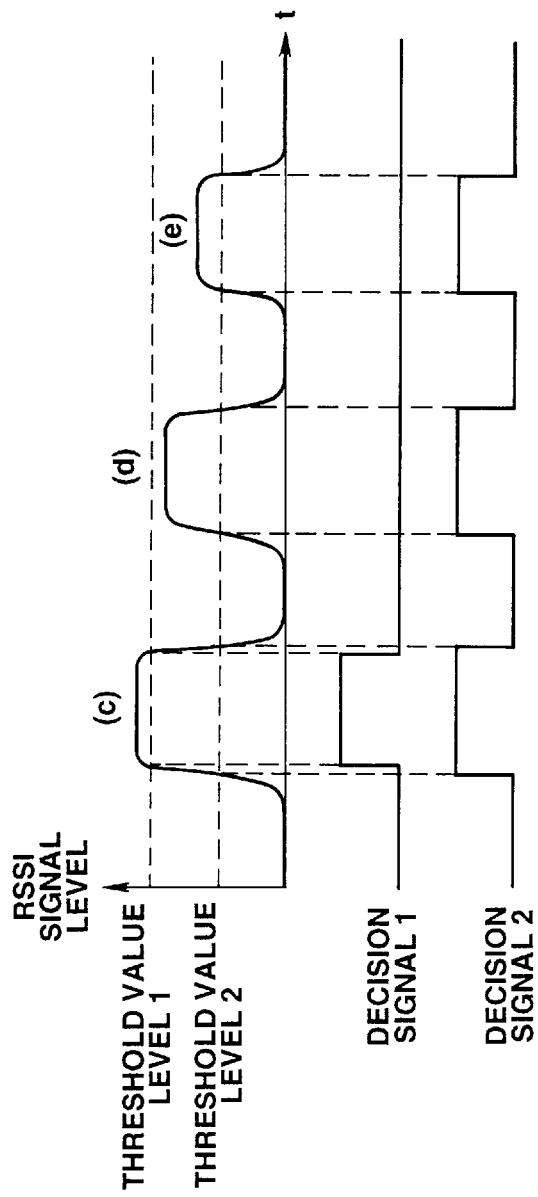
FIG. 5 is a view showing the action of making a decision as to whether there is sufficient sensitivity of reception in synchronous reception in the mobile station shown in FIG. 1.

FIG. 5 shows an example of operation during synchronous reception in this embodiment. During such synchronous reception, the power source of reception unit 12 of radio unit 1 of the mobile station is only turned on at the reception timing. The RSSI signal level of the mobile station immediately after establishment of synchronization with the base station, as shown in FIG. 5(c), is pretty high, so, whether threshold value level TH1 for asynchronous use of threshold value level TH2 for synchronous use is employed, reception sensitivity will be identified as sufficient by the RSSI decision unit 24 of this mobile station.

When thereafter this mobile station moves away from the base station, or electromagnetic wave reception conditions from the base station get worse, the RSSI signal level drops, as shown in FIG. 3(d) and 3(e).

In this case, if the higher threshold value TH1 that was employed during asynchronous reception were to be used, it would be decided that the reception sensitivity has become insufficient during the course of service, and service would therefore be interrupted.

However, in this embodiment, when synchronous reception was begun, a changeover was effected to threshold value level TH2 for synchronous use i.e. a lower threshold value level: the decision that there is sufficient sensitivity for reception therefore continues, and connection with the base station can be maintained.

Thus, with this embodiment, during asynchronous reception, the threshold value TH1 for deciding whether there is sufficient sensitivity for reception for performing the operation of establishing synchronization is set fairly high, so connection 15 only made once a condition has been reached in which the reception level from the base station is sufficiently high i.e. under stable conditions; stable service can thereby be achieved. Also, during synchronous reception the threshold value TH2 for deciding whether there is sufficient sensitivity for the action of maintaining synchronization is set fairly low, so that, once synchronization has been established, the connection with the base station can be continued for as long as possible: by this means also, stability of service is improved.

In the construction of the RSSI decision unit 24 shown in FIG. 2, it would be possible to make the threshold value level TH1 for asynchronous use variable by making one or other of the resistors R1, R2 of the threshold value setting circuit 243 for asynchronous reception a variable resistor.

Likewise, in the construction of RSSI decision unit 24 shown in FIG. 2, the threshold value level TH2 for synchronous use could be made variable by making one or other of the resistors R3, R4 of threshold value setting circuit 244 for synchronous use a variable resistor.

Figure 6:
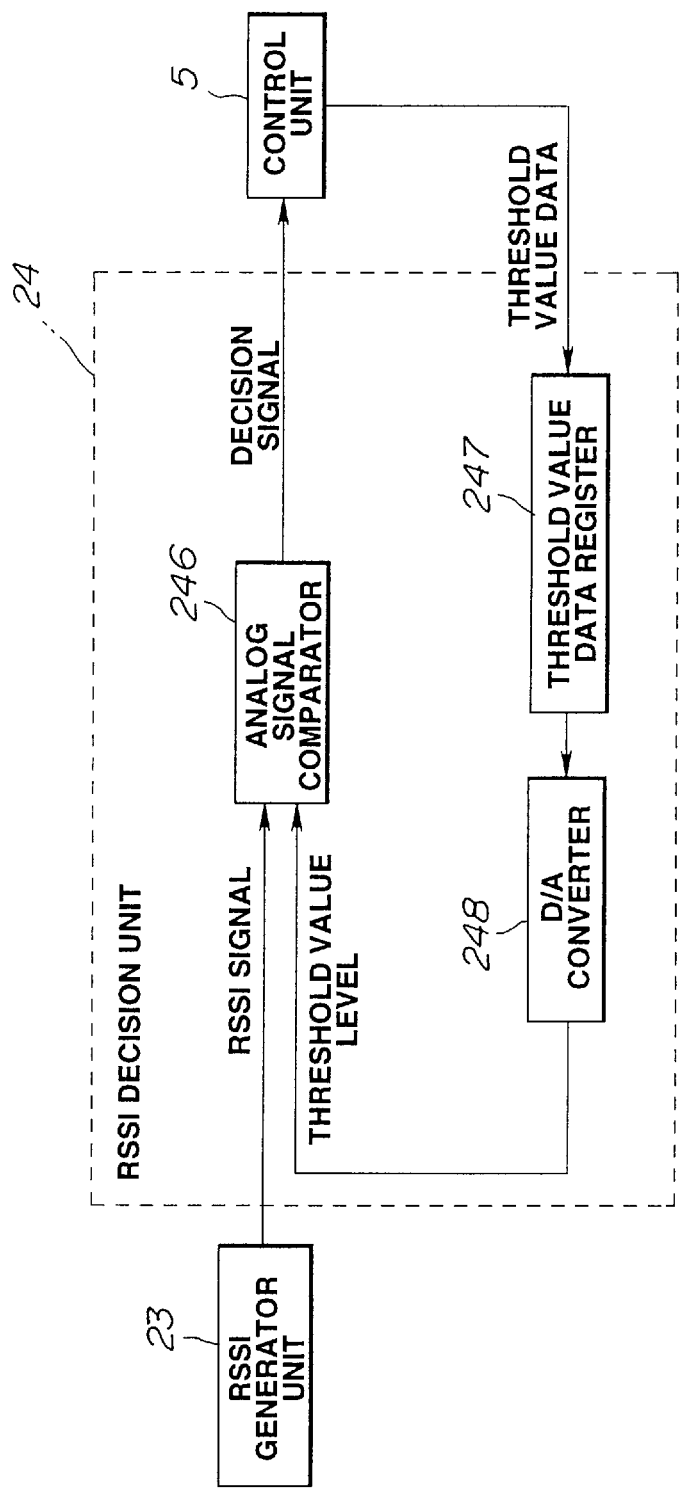
FIG. 6 is a block diagram showing another example of the construction of the RSSI decision unit shown in FIG. 2.

FIG. 6 shows a further example construction of RSSI decision unit 24 shown in FIG. 2. In RSSI decision unit 24 shown in this FIG. 6, the threshold value for the decision that there is insufficient sensitivity for reception by RSSI decision unit 24 is made variable in response to threshold value data output from control unit 5 to RSSI decision unit 24.

For example, in the construction shown in FIG. 6, control unit 5 outputs to RSSI decision unit 24 threshold value data corresponding to the threshold value level TH1 for asynchronous use when the mobile station shown in FIG. 1 is performing asynchronous reception.

This threshold value data D1 is stored in threshold value register 247. Threshold value data D1 stored in this threshold value register 247 is then converted to an analog signal by digital/analog converter (D/A converter) 248, and input to analog comparator 246.

Meanwhile the RSSI signal RS generated by RSSI generator unit 23 is also input to analog comparator 246.

Analog comparator 246 compares the RSSI signal RS generated by this RSSI generating unit 23 with the analog signal (threshold value level TH1 for asynchronous use) corresponding to threshold value data D1 converted by D/A converter 248, and if RS>TH1 is established, outputs decision signal S1 indicating that there is sufficient sensitivity for reception.

Also, in the construction shown in FIG. 6, if the mobile unit shown in FIG. 1 is performing synchronous reception, control unit 5 outputs to RSSI decision unit 24 threshold value data D2 corresponding to the threshold value level TH2 for synchronous use.

In this case, analog comparator 246 compares RSSI signal RS generated by this RSSI generator unit 23 with the analog signal (threshold value level TH2 for asynchronous use) corresponding to threshold value level TH2 for asynchronous use) corresponding to threshold value data D2 converted by D/A converter 248, and, if RS>TH2 is established, outputs decision signal S2, indicating that there is sufficient sensitivity for reception.

In the above construction, by setting the relationship TH1>TH2, the same operation can be performed as in the case where the RSSI decision unit 24 shown in FIG. 2 is employed.

In this case, threshold value level TH1 for asynchronous use and threshold value level TH2 for synchronous use can be set at will by means of the threshold value data output from control unit 5.

Figure 7:
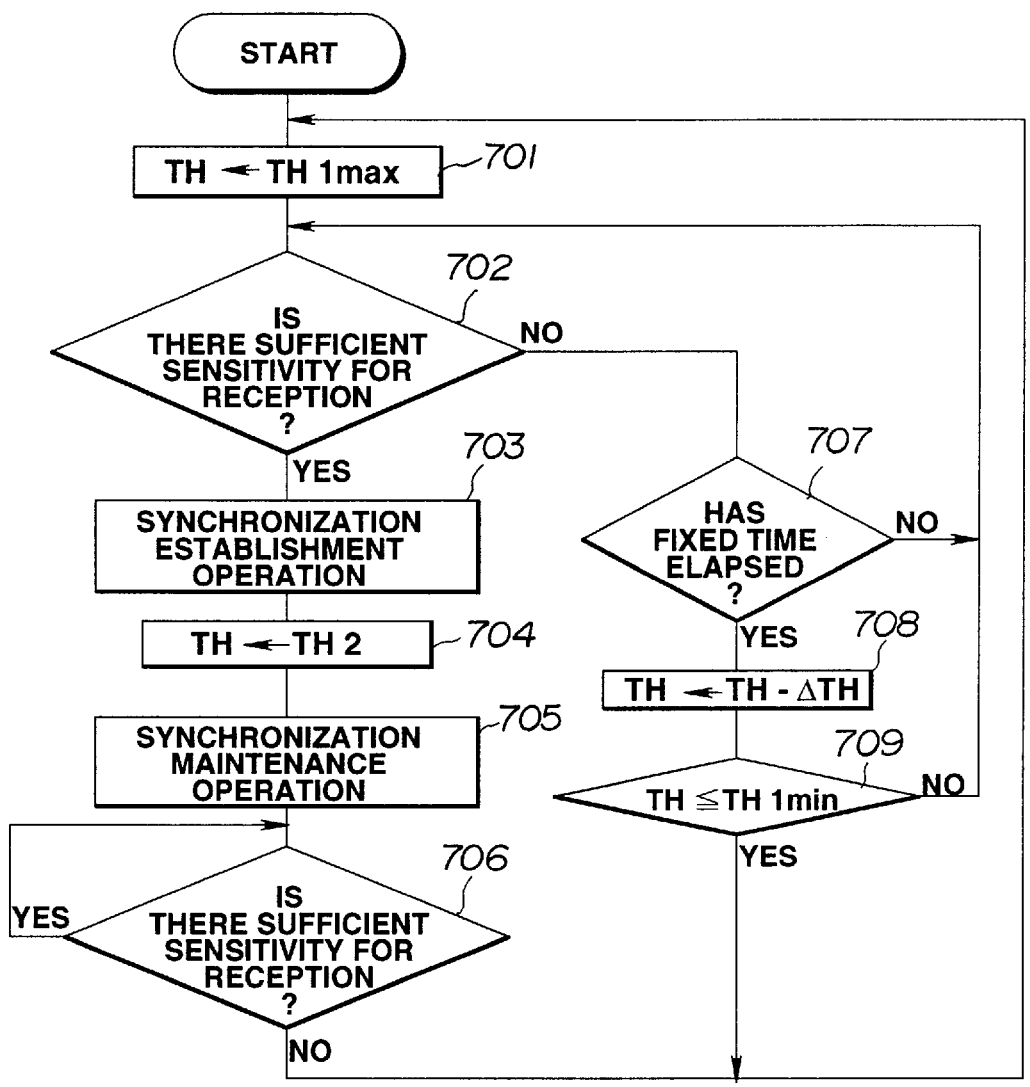
FIG. 7 is a flow chart showing further operation of a control unit in the mobile station shown in FIG. 1.

FIG. 7 shows a flow chart of further operation of control unit 5 in the mobile station shown in FIG. 1. In this embodiment, a case is shown in which the construction shown in FIG. 6 is adopted, which makes it possible to vary the threshold value in accordance with threshold value data output from control unit 5 for RSSI decision unit 24. It should be noted that, even in the case where the RSSI decision unit 24 construction one or other of resistors R1, R2 in threshold value setting circuit 243 for asynchronous reception by a variable resistor, and arranging for this variable resistor to be varied in response to a signal from control unit 5.

In FIG. 7, in control unit 5, the threshold value data that is output to RSSI decision unit 24 is first of all set to a value corresponding to the maximum value of threshold value level TH1 for asynchronous use (step 701).

Next, a check is made, from the output of RSSI decision unit 24, as to whether sensitivity is sufficient for reception or not (step 702).

Thereupon, if there is indeed sufficient sensitivity for reception (YES in step 702), synchronization establishment operation is performed with this base station (step 703).

When synchronization with this base station has been established by the synchronization establishment operation of step 703, the threshold value data that is output to RSSI decision unit 24 is set to a value corresponding to the threshold value level TH2 for synchronization maintenance (step 704), and synchronization maintenance operation to maintain synchronization with this base station is performed (step 705).

Then, the output of RSSI decision unit 24 is monitored (step 706) and, if it is decided that there is sufficient sensitivity for reception from this base station (YES in step 706), the program returns to step 705, and the synchronization maintenance operation is continued.

However, if in step 706 it is decided that there is insufficient sensitivity for reception from this base station (NO in step 706), it is decided that synchronization cannot be maintained for a reason such as that this mobile station has moved outside the area of this base station with which synchronization maintenance operation had been conducted, and processing returns to step 701, shifting to asynchronous reception for establishment of synchronization.

Moreover, if in step 702 it was decided that there was insufficient sensitivity for reception (NO in step 702), a check is made to find whether a fixed time has elapsed (step 707), and, if the fixed time has not elapsed (NO in step 707), processing returns to step 702. However, if the fixed time has indeed elapsed (YES in step 707), the threshold value level TH of RSSI decision unit 24 is made smaller by an amount Δ TH (step 708) and, if this threshold value level TH has not dropped to the minimum value TH1min of threshold value level TH1 for asynchronous use (NO in step 709), processing returns to step 702, and a check is made, from the output from RSSI decision unit 24, as to whether or not there is sufficient sensitivity for reception.

When in this way the threshold value level of RSSI decision unit 24 has dropped to the threshold value level TH1 for asynchronous use, this is considered as a failure of the operation to establish synchronization establishment operation to be again attempted.

In the construction shown in FIG. 7, when the mobile station is performing asynchronous reception, first of all, the threshold value level of RSSI decision unit 24 is set to the maximum value; the threshold value level of RSSI decision unit 24 is then progressively lowered in stages until the first base station deemed to be of sufficient sensitivity for reception is detected, whereupon the operation of establishing synchronization with this base station if performed. With this arrangement, connection can be achieved with the base station whose received magnetic field intensity is strongest, thus further increasing reliability of service.

Figure 8:
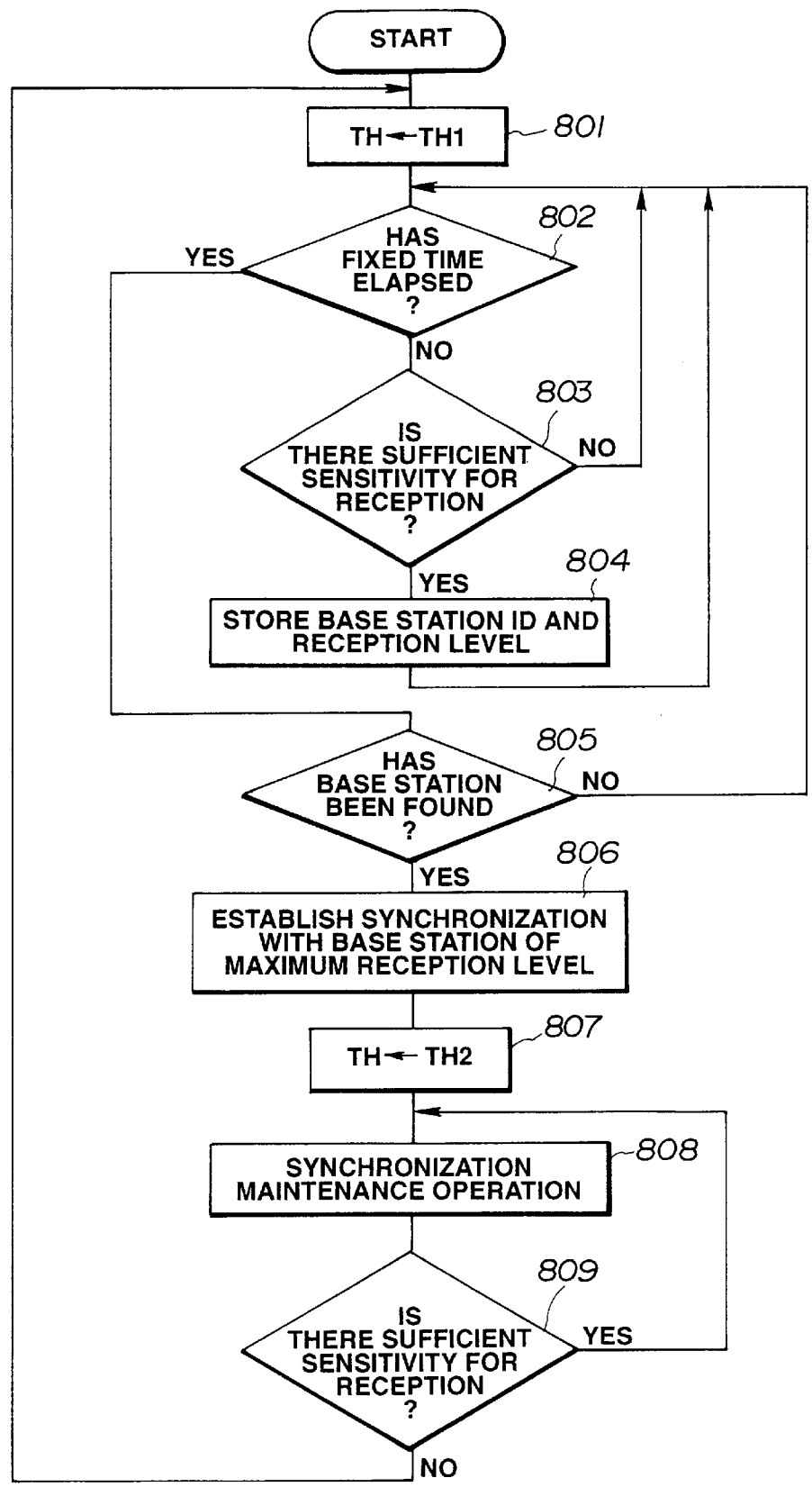
FIG. 8 is a flow chart showing yet further operation of the control unit in the mobile station shown in FIG. 1.

FIG. 8 shows a flow chart of further operation of the control unit 5 in the mobile station shown in FIG. 1. In this embodiment shown in FIG. 8, when the mobile station is performing asynchronous reception, it stores the base stations detected during a fixed time as being of sufficient sensitivity for reception and also the received field intensity of these base stations, and is arranged to effect connection with the base station, of these stored base stations, that has the maximum received field intensity.

Specifically, in FIG. 8, control unit 5 first of all sets the threshold value level TH of RSSI decision unit 24 to the threshold value level TH1 for asynchronous use (step 801). A check is then performed to see whether a fixed time has elapsed after the setting of threshold value level TH of this RSSI decision unit 24 to the threshold value level TH1 for asynchronous use (step 802; if this fixed time has not elapsed (NO in step 802), a check is performed as to whether the reception sensitivity is sufficient or not, using for this purpose the output from RSSI decision unit 24 (step 803). If there is insufficient sensitivity for reception (NO in step 803), processing returns to step 802.

Also, if, in this step 803 it is found that there is indeed sufficient sensitivity for reception (YES in step 803), the identification information (ID) of the base station deemed to have this sufficient reception sensitivity, as well as the reception level of this base station (received field intensity) are stored in memory unit 9 shown in FIG. 1 (step 804), and processing returns to step 802.

By means of this processing, if there is a base station capable of connection with this mobile station, the identification information (ID) of this base station and its reception level (received field intensity) are stored in memory unit 9. If there are a plurality of base stations that are capable of connection with this mobile station, the identification information (IDs) of this plurality of base stations and their reception levels (received signal intensities) are respectively stored in memory unit 9.

Thus, if in step 802 it is decided that the fixed time has elapsed (YES in step 802), next, a check is made (step 805) to ascertain whether or not any base station that is capable of connection with the mobile station has been found by the above processing i.e. whether or not there exists a base station whose identification information (ID) and reception level (received field intensity) are stored in memory 9.

In step 805, if it is decided that a base station has been found that is capable of connection with this mobile station (YES in step 805), the base station whose reception level is largest is looked up from the base station identification information (IDs) and their reception levels (received field intensities) stored in memory unit 9, and synchronization establishment operation is conducted with this base station (step 806).

If, by the synchronization establishment operation of step 806, synchronization is established with this base station, the threshold value level TH of RSSI decision unit 24 is set to threshold value level TH2 for synchronous use (step 807), and synchronization maintenance operation to maintain synchronization with this base station is performed (step 808).

The output of RSSI decision unit 24 is then monitored (step 809); if it is decided that this base station has sufficient sensitivity for reception (YES in step 809), processing returns to step 808 and synchronization maintenance operation is continued; if, in step 809, it is decided that his base station does not have sufficient sensitivity for reception (NO in step 809), it is decided that synchronization cannot be maintained, for some reason such as that the mobile station has moved out of the area of this base station with which synchronization maintenance operation was being performed. Processing then returns to step 801, and a shift takes place to asynchronous reception, seeking to establish synchronization.

Also, if, in step 805, no base station is found that is capable of connection (NO in step 805), processing returns to step 802, and the fixed time that is decided in step 802 is reset.

Thus, with this construction, connection can be achieved with the base station whose received field intensity is largest, and stability of service can be raised.

Figure 9:
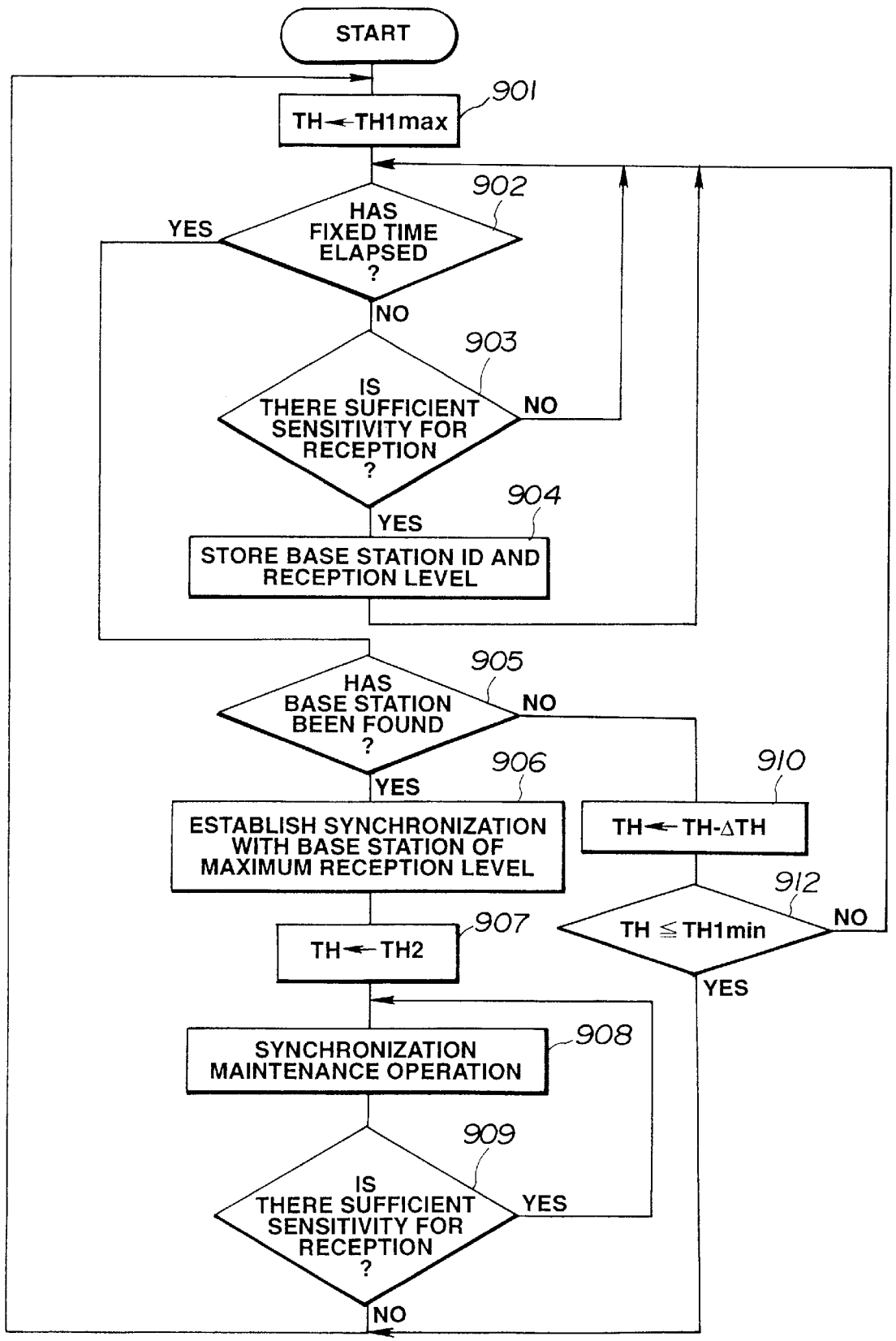
FIG. 9 is a flow chart showing yet further operation of the control unit in the mobile station shown in FIG. 1.

FIG. 9 shows a flow chart of yet further operation of control unit 5 in the mobile station shown in FIG. 1. In this embodiment shown in FIG. 9, just as in the embodiment shown in FIG. 8, base stations which are detected as having sufficient sensitivity for reception within a fixed time and the received field intensity of these space stations are stored, and the construction is such that connection is effected with the base station, of these stored base stations, that has maximum received field intensity. However, the construction whereby, in the above processing, the threshold value level of RSSI decision unit 24 is set to the maximum and thereafter the threshold value level of this RSSI decision unit 24 is successively lowered in stepwise manner until a base station is found for which there is sufficient reception sensitivity is different from that shown in FIG. 8.

Specifically, in FIG. 9, first of all the threshold value level TH of RSSI decision unit 24 is set to the maximum value of the threshold value level TH1 for asynchronous use (step 901). A check is then made (step 902) to ascertain whether or not a fixed time has elapsed since the threshold value level TH of this RSSI decision unit 24 was set to threshold value level TH1 for asynchronous use; if this fixed time has not yet elapsed (NO in step 902), a check is made to ascertain whether or not there is sufficient sensitivity for reception, using for this purpose the output from RSSI decision unit 24 (step 903). If there is not sufficient sensitivity for reception (NO in step 903), processing returns to step 902.

Also, if, in step 903, it is found that there is sufficient sensitivity for reception (YES in step 903), the identification information (ID) of this base station that has been decided to have sufficient sensitivity for reception, and the reception level (received field intensity) of this base station are stored in memory unit 9 shown in FIG. 1 (step 904), and processing returns to step 902.

Thus, by means of this processing, if there is a base station that is capable of connection with this mobile station, the identification information (ID) of this base station and its reception level (received field intensity) are stored in memory unit 9.

When, in step 902, it is decided that the fixed time has elapsed (YES in step 902), next, a check is made (step 905) to see whether a base station capable of connection with this mobile station has been found by the above processing i.e. whether there is in memory unit 9 a base station whose identification information (ID) and reception level (received field intensity) have been stored (step 905).

If, in step 905, it is decided that a base station that is capable of being connected with the mobile station has been found (YES in step 905), the base station of maximum reception level is looked up from the base station identification information (IDs) and their reception levels (received field intensities) stored in memory unit 9, and the operation of establishing synchronization with this base station is performed (step 906).

When synchronization is established with this base station by the synchronization establishment operation of step 906, threshold value level TH of RSSI decision unit 24 is set to the threshold value level TH2 for synchronous use (step 907), and synchronization maintenance operation to maintain synchronization with the base station is performed (step 908).

Then, the output of RSSI decision unit 24 is monitored (step 909), and, if it is decided that this base station has sufficient sensitivity for reception (YES in step 909), processing returns to step 908 and synchronization maintenance operation is continued; if, in step 909, it is decided that this base station has insufficient sensitivity for reception (NO in step 909), it is decided that synchronization maintenance cannot be performed for some reason such as that this mobile station has moved out of the area of this base station with which synchronization maintenance operation was being conducted, and processing returns to step 901 i.e. a shift takes place to asynchronous reception, seeking to establish synchronization.

Also, if in step 905 a base station with which connection is possible has not been found (NO in step 905), the threshold value level TH of RSSI decision unit 24 is made smaller by an amount $\Delta$ TH (step 910); if this threshold value level TH has not thereby been lowered to the minimum value TH1min of the threshold value level TH1 for asynchronous use (NO in step 910), processing returns to step 902, and the fixed time that is decided in step 902 is reset.

Also, in step 912, if it is decided (YES in step 912) that the threshold value level TH of RSSI decision unit 24 has now been lowered to the minimum value TH1min of the threshold value level TH1 for asynchronous use, this is regarded as a failure of the operation to establish synchronization, and processing returns to step 901 and the synchronization establishment operation is again attempted.

By means of this construction, it is possible to effect connection with the base station of maximum received field intensity, so stability of service can be further improved.

What is claimed is:

1. The mobile radio communication system comprising:
   a base station; and
   a mobile station connected by radio with the base station, and employing the time division multiple access system,
   wherein the mobile station has field intensity detection means that detects the field intensity of a signal transmitted by the base station,
   and synchronization establishment and maintenance control means whereby: at the commencement of communication with the base station asynchronous reception is performed of signals from the base station, and synchronization establishment control is conducted whereby a synchronization establishment operation with the base station is performed under the condition that the field intensity detected by the field intensity detection means exceeds a first threshold value; and, after establishment of synchronization with the base station by the synchronization establishment operation, a synchronization maintenance operation is conducted with the base station under the condition that the field intensity detected by the field intensity detection means exceeds a second threshold value smaller than the first threshold value.

2. The mobile radio communication system according to claim 1 wherein the synchronization establishment and maintenance control means comprises:
   reception sensitivity decision means that, by comparing the field intensity detected by the field intensity detection means with the first threshold value and the second threshold value, outputs a first decision signal if the field intensity exceeds the first threshold value, and outputs a second decision signal if the field intensity exceeds the second threshold value; and
   control means that performs the synchronization establishment operation based on the first decision signal which is output from the reception sensitivity decision means and that performs the synchronization maintenance operation based on the second decision signal that is output from the reception sensitivity decision means.

3. The mobile radio communication system according to claim 2, wherein the reception sensitivity decision means comprises:
   first threshold value setting means that sets the first threshold value;
   first comparison means that outputs the first decision signal by comparing the field intensity detected by the field intensity detection means with the first threshold value set by the first threshold value setting means;
   second threshold value setting means that sets the second threshold value;
   second comparison means that outputs the second decision signal by comparing the field intensity detected by the field intensity detection means with the second threshold value set by the second threshold value setting means; and
   selection means that selectively outputs the first decision signal that is output from the first comparison means or the second decision signal that is output from the second comparison means, under the control of an instruction from the control means.

4. The mobile radio communication system according to claim 3, wherein
   the first threshold value setting means sets the first threshold value in a way that can be altered.

5. The mobile radio communication system according to claim 3, wherein, the second threshold value setting means sets the second threshold value in a way that can be altered.

6. The mobile radio communication system according to claim 3, wherein, the control means, if the synchronization establishment operation is being performed, instructs the selection means to select the first decision signal, and, if the synchronization maintenance operation is being performed, instructs the selection means to select the second decision signal.

7. The mobile radio communication system according to claim 2, wherein, the reception sensitivity decision means has threshold value data storage means that stores first and second threshold value data and comparison means that outputs a decision signal by comparing the field intensity detected by the field intensity detection means with a threshold value corresponding to one of the stored first and second threshold value data stored in the threshold value data storage means.

8. The mobile radio communication system according to claim 7, wherein, the control means, in the case where the synchronization establishment operation is being performed, outputs the first threshold value data corresponding to the first threshold value to the reception sensitivity decision means, and, if the synchronization maintenance operation is being performed, outputs the second threshold value data corresponding to the second threshold value to the reception sensitivity decision means.

9. The mobile radio communication system according to claim 2, wherein, the control means, if the synchronization establishment operation is being performed, outputs firs threshold value data corresponding to the first threshold value to the reception sensitivity decision means which is successively diminished, and, when the detected field intensity exceeds the first threshold value, controls the synchronization establishment operation with the base station.

10. A mobile station which is connected by radio with a base station by using a time division multiple access system, comprising:

field intensity detection means that detects field intensity of a signal transmitted by the base station; and synchronization establishment and maintenance control means that, on commencement of communication with the base station, receives the signal from the base station asynchronously, and, under the condition that the field intensity detected by the field intensity detection means exceeds a first threshold value, performs synchronization establishment control in which synchronization establishment operation is performed with the base station, and, after establishment of synchronization with the base station by the synchronization establishment operation, under the condition that the field intensity detected by the field intensity detection means exceeds a second threshold value smaller than the first threshold value, performs synchronization maintenance operation with the base station.

11. The mobile station according to claim 10, wherein the synchronization establishment and maintenance control means has a reception sensitivity decision means that, by comparing the field intensity detected by the field intensity detection means with the first threshold value and the second threshold value, outputs a first decision signal if the field intensity exceeds the first threshold value and outputs a second decision signal if the field intensity exceeds the second threshold value and control means that performs the synchronization establishment operation based on the first decision signal that is output from the reception sensitivity decision means and that performs the synchronization maintenance operation based on the second decision signal that is output from the reception sensitivity decision means.

12. The mobile station according to claim 11, in which, the reception sensitivity decision means comprises:

first threshold value setting means that sets the first threshold value;

first comparison means that outputs the first decision signal by comparing the field intensity detected by the field intensity detection means with the first threshold value set by the first threshold value setting means;

second threshold value setting means that sets the second threshold value;

second comparison means that outputs the second decision signal by comparing of the field intensity detected by the field intensity detection means with the second threshold value set by the second threshold value setting means; and selection means that selectively outputs in accordance with an instruction from the control means the first decision signal that is output from the first comparison means or the second decision signal that is output from the second comparison means.

13. The mobile station according to claim 11 wherein the reception sensitivity decision means comprises:

threshold value data storage means that stores first and second threshold value data; and comparison means that outputs a decision signal by comparing the field intensity detected by the field intensity detection means with a threshold value corresponding to one of the stored first and second threshold value data.

14. The mobile station according to claim 11, wherein the control means, if the synchronization establishment operation is being performed, outputs first threshold value data corresponding to the first threshold value to the reception sensitivity decision means, and, if the synchronization maintenance operation is being performed, outputs second threshold value data corresponding to the second threshold value to the reception sensitivity decision means.

15. The mobile station according to claim 11, wherein, the control means, if the synchronization establishment operation is being performed, outputs first threshold value data corresponding to the first threshold value to the reception sensitivity decision means which is successively diminished, and, when the detected field intensity exceeds the first threshold value, controls the synchronization establishment operation with the base station.

16. The mobile station according to claim 11, wherein said mobile station is connected by radio with any one of a plurality of base stations and the control means, if the synchronization establishment operation is being performed, outputs first threshold value data corresponding to the first threshold value to the reception sensitivity decision means, and the field intensity detection means detects a plurality of field intensities of signals transmitted by the plurality of base stations and, when any of the detected field intensities exceeds the first threshold value, stores identifications of the corresponding base stations and the field intensities of these base stations, and said control means controls the synchronization establishment operation with the base station that has the largest field intensity of the stored field intensities.

17. The mobile station according to claim 16, wherein the control means, if the synchronization establishment operation is being performed, outputs first threshold value data corresponding to the first threshold value to the reception sensitivity decision means which is successively diminished.

18. Radio telecommunication apparatus for use in a radio telecommunication system, wherein the system encompasses a plurality of areas each having one base station which broadcasts first and second signals, comprising:

first receiving means for receiving the first signal continuously;

establish means for establishing a synchronization with the base station if the quality of the received first signal is higher than a first criterion;

second receiving means, in response to the establish means, for receiving the second signal;

maintain means for maintaining the established synchronization if the quality of the second received signal is higher than a second criterion which is smaller than the first criterion.

19. The apparatus according to claim 18, wherein the apparatus is used for time division multiple access radio telecommunication system.

20. Radio telecommunication apparatus for use in a radio telecommunication system, wherein the system encompasses a plurality of areas each having one base station, the apparatus comprising:

first receiving means for receiving a plurality of first signals from a plurality of base stations:

detecting means for detecting the quality of each first signal;

determining means for determining at least one base station from which the detected quality of each signal is higher than a first criterion;

select means for selecting one of the determined base stations broadcasting the signal whose detected quality is highest:

establish means for establishing a synchronization with the selected base station;

second receiving means, in response to the establish means, for receiving a second signal; and maintain means for maintaining the established synchronization if the quality of the second received signal is higher than a second criterion which is smaller than the first criterion.

\* \* \* \* \*

UNITED STATES PATENT AND TRADEMARK OFFICE
CERTIFICATE OF CORRECTION

PATENT NO. : 5,774,810
DATED : June 30, 1998
INVENTOR(S) : Nobuo SUGI

It is certified that error appears in the above-identified patent and that said Letters Patent is hereby corrected as shown below:

Claim 1, line 1, delete "The" and insert --A--.

Claim 9, line 3, delete "firs" and insert --first--.

Signed and Sealed this

Twenty-second Day of September, 1998

Attest:

BRUCE LEHMAN

Attesting Officer  Commissioner of Patents and Trademarks